UNITED STATES PATENT OFFICE.

KAUFMAN G. FALK AND KANEMATSU SUGIURA, OF NEW YORK, N. Y., ASSIGNORS TO
GEORGE B. PEGRAM, OF NEW YORK, N. Y.

TETRA-IODO-HEXAMETHYLENETETRAMIN COMPOSITION.

1,275,162.    Specification of Letters Patent.    Patented Aug. 6, 1918.

No Drawing.    Application filed June 23, 1917. Serial No. 176,539.

*To all whom it may concern:*

Be it known that we, KAUFMAN GEORGE FALK and KANEMATSU SUGIURA, citizens of the United States and Japan, respectively, residing at New York, in the county of New York and State of New York, have invented certain new and useful Improvements in Tetra-Iodo-Hexamethylenetetramin Composition, of which the following is a specification.

The principal object of our invention is to facilitate the use of tetra-iodo-hexamethylenetetramin for antiseptic and germicidal purposes, and especially for various external applications, such as for cuts, wounds, abrasions, incisions, sterilizing healthy skin, as a surgical dressing, for stimulating tissues and to favor rapid healing by the killing of bacteria.

It has long been known that tincture of iodin has effective antiseptic properties, but in this form the iodin is known to possess certain irritating properties. Another drawback in connection with the use of iodin in such form is that it somewhat rapidly attacks the organic tissue with which it comes in contact. Also to some extent the iodin vaporizes from the surface to which it has been applied and its effect is correspondingly decreased.

We have discovered as the result of extensive investigation that treta-iodo-hexamethylenetetramin has very powerful antiseptic and germicidal properities under certain conditions and that it can be applied very effectively in the form and according to the method which we now proceed to illustrate by several specific examples.

1. Tetra-iodo-hexamethylenetetramin is dissolved in collodion, a one per cent. solution or weaker, and this is applied as a dressing for external cuts, sores, wounds, etc.

2. Tetra-iodo-hexamethylenetetramin is emulsified to make a one per cent. glycerin emulsion and this can be used as a wash or dressing for cuts, sores, wounds, etc. Also the glycerin emulsion may be used on mucous membrane, or in the nasal passages, or in the throat.

3. A small proportion of tetra-iodo-hexamethylenetetramin may be incorporated with vaseline or an unguentum or a similar menstruum for application to external cuts, sores, wounds, etc.

4. A small proportion of tetra-iodo-hexamethylenetetramin is mixed with talcum powder or any similar dry dusting powder or with boric acid and is applied in the dry form.

From our investigations it appears that under suitable conditions such as the influence of moisture, the tetra-iodo-hexamethylenetetramin applied as above, gives off iodin very slowly. Hence it is that when applied in any suitable form to the skin or other part of the body, iodin is liberated slowly. It is probable that the beneficial effect of this substance is largely due to this action. Applied in this way the iodin has a strong antiseptic action but it exhibits little or no irritating or escharotic effect. Moreover, our tests tend to show that the iodin is liberated but slowly and at a rate merely sufficient to make up for that which is absorbed in its antiseptic action.

It is apparent that the compound by its gradual decomposition constitutes a substantial source of free iodin which may be utilized for its antiseptic and germicidal actions by the methods described.

It is further probable that as the iodin is liberated from the tetra-iodo-hexamethylenetetramin under the conditions set forth there is some further chemical decomposition of the residue; with the addition of water the hexamethylenetetramin breaks down into formaldehyde and ammonia and the disinfecting action of the formaldehyde is brought about.

Our preparations exert a very beneficial and antiseptic and germicidal action stimulating the tissues and promoting healing which action is due partially at least though not necessarily wholly to the liberation of iodin and the probable liberation of formaldehyde.

Our new means for producing a germicidal effect may be employed under other circumstances than by mere immediate application of the compostion involved to living animal tissue. By the agencies here disclosed surgical dressings, instruments and other objects may be sterilized. If it is necessary to fascilitate the sterilizing effect, moisture in the form of water or alcohol or an equivalent may be associated with such an object.

In all the examples of practice under our invention as disclosed herein, it will be seen that the proportion of the tetra-iodo-hexamethylenetetramin is small compared to the quantity of the vehicle. In the composition, there should be enough tetra-iodo-hexamethylenetetramin to give bactericidal action and antisepsis but on the other hand there should be enough of the vehicle so that the evolution of iodin shall be slow and prolonged. In all the cases above considered the vehicle is a substance of relatively mobile elementary parts and has the tetra-iodo-hexamethylenetetramin uniformly diffused therethrough. In all these cases the vehicle is a neutral substance, not a strong acid or base, else it would react with the tetra-iodo-hexamethylenetetramin and combine with the iodin. Also in all these cases the vehicle is a saturated substance. Unsaturated substances such as castor oil, lanolin and olive oil are entirely unsuitable as they would quickly abstract the iodin from the tetra-iodo-hexamethylenetetramin and unite chemically therewith.

We claim:

1. A composition of matter to be used as an antiseptic, healing or sterilizing agent for topical application comprising tetra-iodo-hexamethylenetetramin uniformly diffused in collodion, in the relative proportion of substantially 1 to 99.

2. A composition of matter to be used as an antiseptic, healing or sterilizing agent comprising tetra-iodo-hexamethylenetetramin and a liquid solvent therefor, the solvent constituting the major portion of the composition and being present in sufficient proportion to prolong any liberation of iodin from the tetra-iodo-hexamethelenetetramin, and the latter ingredient constituting the minor portion of the composition and being present in sufficient proportion to insure bactericidal action and antisepsis, the solvent being substantially inert chemically with respect to said tetra-iodo-hexamethylenetetramin and capable of adhering to the surface to which applied and of forming a protective coating therefor.

3. A composition of matter to be used as an antiseptic, healing or sterilizing agent comprising tetra - iodo - hexamethylenetetramin and a vehicle therefor, the vehicle constituting the major portion of the composition and having the tetra-iodo-hexamethylenetetramin uniformly diffused therethrough, and being present in sufficient proportion to prolong any liberation of iodin from the tetra-iodo-hexamethylenetetramin, and the latter ingredient constituting the minor portion of the composition and being present in sufficient proportion to insure bactericidal action and antisepsis, the vehicle being a substance of relatively mobile elementary parts and substantially inert chemically with respect to said tetra-iodo-hexamethylenetetramin and capable of adhering to the surface to which applied and of forming a protective coating therefor.

4. A composition of matter to be used as an antiseptic, healing or sterilizing agent comprising tetra - iodo - hexamethylenetetramin and a vehicle therefore, the vehicle constituting the major portion of the composition and having the tetra-iodo-hexamethylenetetramin uniformly diffused therethrough, and being present in sufficient proportion to prolong any liberation of iodin from the tetra-iodo-hexamethylenetetramin, and the latter ingredient constituting the minor portion of the composition and being present in sufficient proportion to insure bactericidal action and antisepsis, the vehicle being a neutral saturated substance of relatively mobile elementary parts, and capable of adhering to the surface to which applied and of forming a protective coating therefor.

KAUFMAN G. FALK.
KANEMATSU SUGIURA.